United States Patent [19]

Miyakawa

[11] 4,365,916

[45] Dec. 28, 1982

[54] TURNING TYPE MULTI-SPINDLE ATTACHMENT

[75] Inventor: Eiji Miyakawa, Tokyo, Japan

[73] Assignee: Miyakawa Industry Co., Ltd., Seki, Japan

[21] Appl. No.: 177,475

[22] Filed: Aug. 12, 1980

[30] Foreign Application Priority Data

Feb. 26, 1980 [JP] Japan .............................. 55-23999[U]

[51] Int. Cl.³ .............................................. B23B 39/20
[52] U.S. Cl. .............................. 408/46; 74/665 GA; 408/126; 409/144; 409/230
[58] Field of Search ................. 408/46, 124, 125, 126, 408/224, 236, 237; 74/665 GA, 392, 397; 173/163; 51/241 B; 409/144, 217, 230

[56] References Cited

U.S. PATENT DOCUMENTS

| 2,589,485 | 3/1952 | Emrick | 74/665 GA |
| 3,316,779 | 5/1967 | Schultz | 408/35 |
| 3,849,018 | 11/1974 | Anderson | 408/46 |

FOREIGN PATENT DOCUMENTS

| 1298939 | 7/1969 | Fed. Rep. of Germany | 173/163 |
| 2616550 | 10/1977 | Fed. Rep. of Germany | 408/46 |
| 174047 | 9/1965 | U.S.S.R. | 408/224 |

OTHER PUBLICATIONS

Miyakawa Industrial Company, Ltd. Catalogue, May 6, 1976.

*Primary Examiner*—Z. R. Bilinsky
*Attorney, Agent, or Firm*—Armstrong, Nikaido, Marmelstein & Kubovcik

[57] ABSTRACT

The invention provides a turning type multi-spindle attachment used for mounting a plurality of drills or taps to a drilling or tapping machine. This attachment comprises a mounting cylinder fixed to the spindle quill of the drilling or tapping machine and a body positioned such that a turning position thereof is adjustable relative to the mounting cylinder, whereby a plurality of drills or taps are rotatably supported by the body. The position of the drills or taps is adjustable around the mounting cylinder by causing turning of the body relative to the mounting cylinder.

3 Claims, 7 Drawing Figures

TURNING TYPE MULTI-SPINDLE ATTACHMENT

FIELD OF THE INVENTION

The present invention relates to a turning type multi-spindle attachment adapted for use with a drilling or tapping machine.

OBJECTS OF THE INVENTION

An object of the present invention is to provide a turning type multi-spindle attachment which makes possible continuous forming of a number of bores or tappings on a work in a simple manner even with the use of a small-sized drilling or tapping machine to which a number of drills or taps cannot be mounted at one time due to its motor having a limited power output.

Another object of the present invention is to provide a turning type mult-spindle attachment which permits easily adjustable turning of an attachment body having drills or taps relative to the spindle quill of a drilling or tapping machine.

A further object of the present invention is to provide a turning type multi-spindle attachment which permits easily adjustable turning of an attachment body having drills or taps relative to the spindle quill of a drilling or tapping machine, and allows reliable location of a turning position of said body.

A still further object of the present invention is to provide a turning type multi-spindle attachment which makes a wider area of a work available for boring or tapping, when the work is held in place.

Other objects of the present invention will become apparent from an understanding of the following description, and will definitely be stated in the appended claims. Numerical advantages not referred to herein will also become apparent to those skilled in the art by carrying out the present invention.

DETAILED DESCRIPTION OF THE PREFERRED EMBODIMENT

Figure 1:
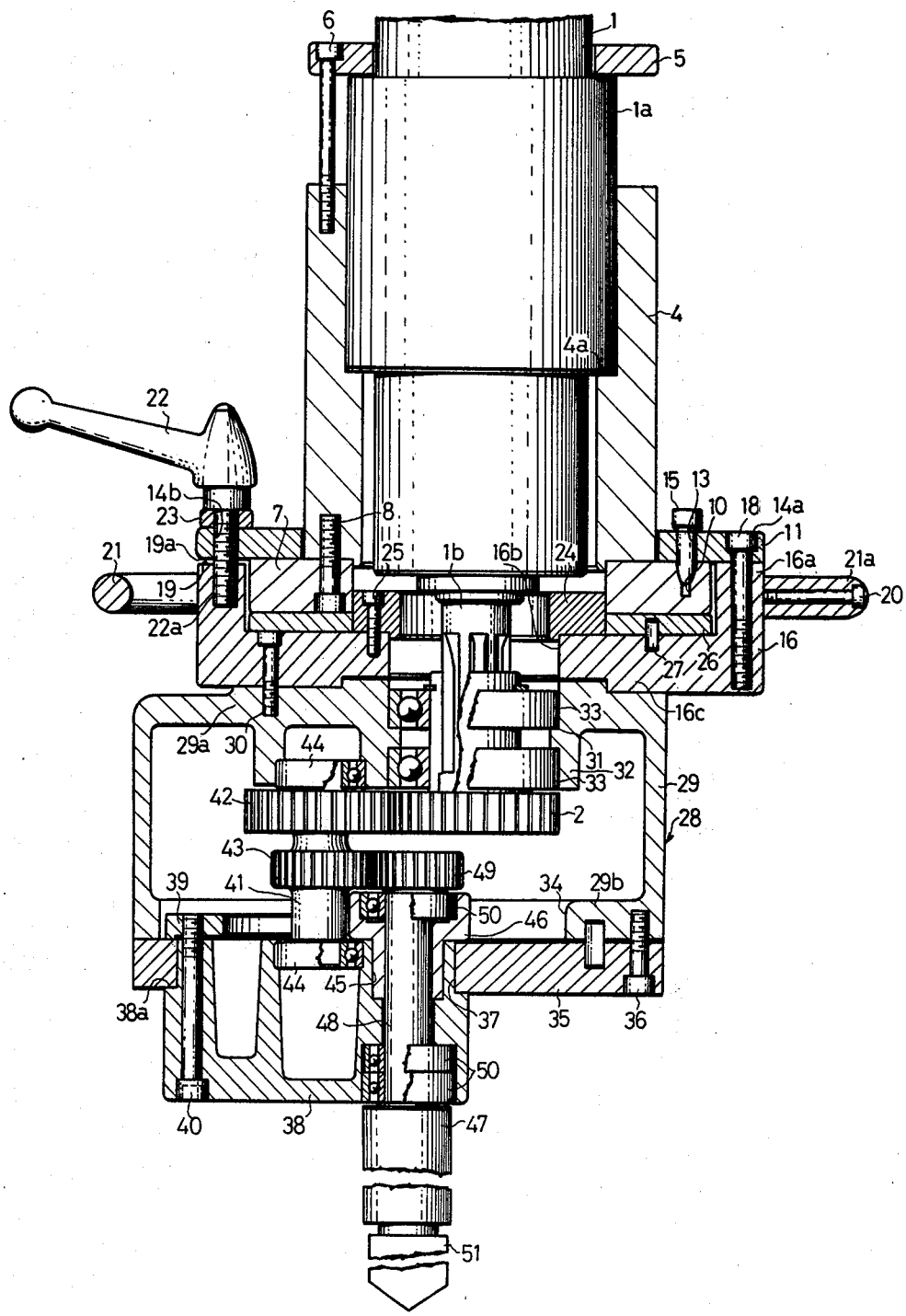
FIG. 1 is a sectional view of a first embodiment of the turning type multi-spindle attachment according to the present invention, which is attached to the spindle quill of a drilling machine.

Referring now to FIGS. 1 through 4, there is shown a first embodiment of the present invention applicable to a drilling machine.

The drilling machine includes a spindle quill 1, an enlarged portion 1a thereof, and a main gear 2 extending from said portion 1a, which is integrated with a main spindle 1b passing through the quill 1.

A mounting cylinder, shown at 4, for the multi-spindle attachment according to the present invention is detachably mounted on the lower portion of the quill 1, and has an engaging step 4a formed on the inner periphery and kept in engagement with the lower face of the enlarged portion 1a. A mounting ring 5 is fitted onto the upper face of the enlarged portion 1a. The mounting cylinder 4 is secured to the quill 1 by threadedly inserting from above said ring a plurality of bolts 6 (only one which is illustrated) into the cylinder 4.

Figure 4:
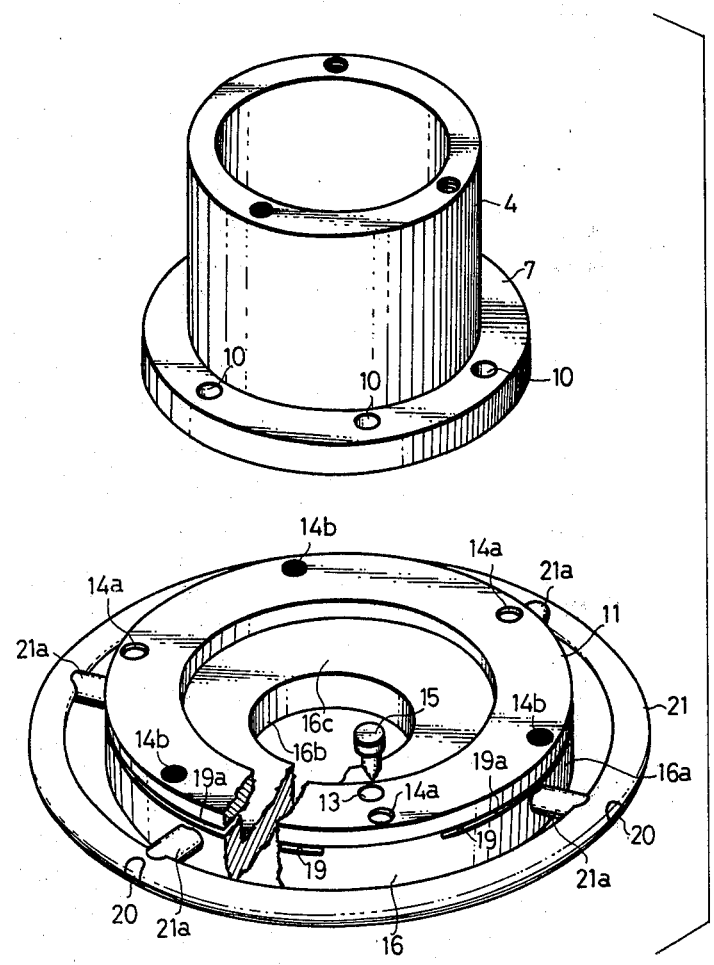
FIG. 4 is a perspective view of a mounting cylinder and a mounting member.

As shown in FIGS. 1 and 4, an annular support plate 7 is mounted on the lower end of the mounting cylinder 4, and is fixed to the cylinder 4 by a plurality of bolts 8 (only one of which is shown) threadedly inserted from below. The support plate 7 is provided on the upper face with a plurality of locating holes 10 at 60° intervals. An annular abutment plate 11 takes abutment onto the support plate 7, and is provided in its part with a through-hole 13 in register with any one of the locating holes 10. A locating pin 15 is inserted into the through-hole 13 from above, and has its lower end extending into the locating hole 10 in the support plate 7.

A plurality of through-holes 14a for insertion of bolts are provided on the outer periphery of the abutment plate 11 at equal spacings, and a plurality of tapped through-holes 14b are provided in the abutment plate 11 at the intermediate portion of the respective through-holes 14a.

A mounting member 16 in the cylindrical form is mounted on the lower face of the abutment plate 11, and is rotatably fixed integrally with the abutment plate 11 by threadedly inserting into a cylindrical portion 16a a plurality of bolts 18 passed into the bolt-inserting holes 14a of the abutment plate 11 from above. A plurality of recessions 19 are formed in the upper face of the portion 16a of the mounting member 16 at positions corresponding to the respective tapped through-holes 14b, and define spaces 19a with respect to the lower face of the abutment plate 11. A plurality of clamp levers 22 have their threaded portions 22a inserted into the respective tapped through-holes 14b from above. The point end of each portion 22a is threadedly inserted into the cylindrical portion 16a of the mounting member 16. Reference numeral 23 denotes a collar.

An annular turning handle 21 is mounted around the cylindrical portion 16a of the mounting member 16, and adapted to be rotatable in integral relation to the mounting member 16 by a bolt 20 threadedly inserted into the cylindrical portion 16a from the outer periphery of a plurality of arm sections 21a.

A through-hole 16b is provided in the central portion of the bottom wall 16c of the mounting member 16 for insertion of the spindle 1b.

A first ring 24 is formed on the upper periphery of the through-hole 16b, and is fixed on the bottom wall 16c of the mounting member 16 by a bolt 25 inserted from above. On the outer periphery, the first ring 21 is tangent to the inner periphery of the support plate 7.

A second ring 26 is interposed between the upper face of the bottom wall 16c of the mounting member 16 and the support plate 7 disposed thereabove on the outside of the first ring 24, and is adapted to be not rotatable relative to the mounting member 16 by a pin 27.

The respective clamp levers 22 are turned to threadedly insert the threaded portions 22a into the mounting member 16, so that the spaces 19a become narrow, whereby the support plate 7 and the second ring 26 are firmly sandwiched between the abutment plate 11 and the bottom wall 16c of the mounting member 16. Thus, the mounting member 16 is held in place such that it is not rotatable relative to the mounting cylinder 4 of the multi-spindle attachment. On the other hand, unloosing the clamp levers 22 brings them into a state where they are turnable relative to the mounting cylinder 4.

Figure 3:
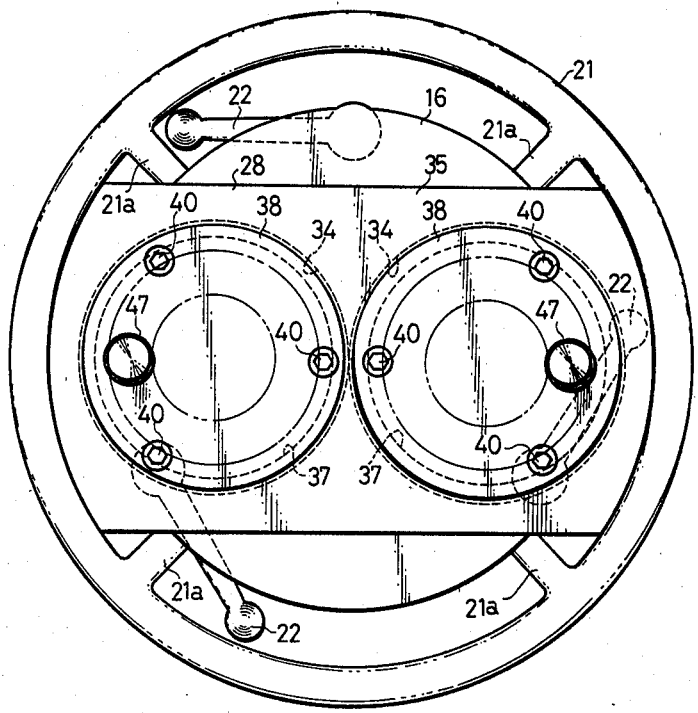

As illustrated in FIGS. 1 and 3, a body of the multi-spindle attachment generally shown at 28 is mounted on the lower face of the bottom wall 16c of the mounting member 16, and includes a casing 29 therefor. The casing 29 is bolted in place by a plurality of bolts 30 (only one of which is illustrated) threadedly inserted from the upper face of the bottom wall 16c of the mounting member 16 into the upper wall 29a thereof. A through-hole 31 is formed in the central portion of the casing upper wall 29a at a position corresponding to the through-hole 16b in the bottom wall 16c of the mounting member 16. An extension 32 is obtained by extending the inner edge of the through-hole 31, and has therein a pair of upper and lower bearings 33 for rotatably supporting the lower portion of the main spindle 1b above the main gear 2.

A pair of through-holes 34 are provided in the bottom wall 29b of the casing 29 (see FIG. 3). Carrier plates 35 for closing the respective through-holes 34 from below are secured on the casing bottom wall 29b by means of a plurality of bolts 36 (only one of which is illustrated). A pair of circular mounting openings 37 (one opening being shown) are thoroughly bored in each carrier plate 35, and have therein the upper portion of a columnar rotatable member 38 inserted rotatably from below. A step 38a formed on the upper periphery of each turnable member 38 is placed in engagement with the lower face of the outer peripheral edge of each mounting hole 37 in each carrier plate 35. A pair of clamp plates 39 (only one of which is illustrated) are provided having their outer peripheral edges taking abutment onto the carrier plates 35 for bearing the respective turnable member 38, and receive therein the point ends of a plurality of bolts 40 passed through from below the member 38.

Firmly threaded insertion of the bolts 40 into the clamp plates 39 causes the carrier plates 35 to be firmly sandwiched between the plates 39 and the steps 38a of the turnable members 38, so that the members 38 are held in place such that they are not rotatable relative to the carrier plates 35. On the contrary, making the bolts 40 loose permits the members 38 to be rotatable relative to the carrier plates 35.

A pair of support shafts 41 (only one shaft being illustrated) are rotatably journalled between the lower face of the upper wall 29a of the casing 29 and the upper portion of each turnable member 38, each having a pair of upper and lower intermediate gears 42 and 43. The respective shafts 41 are positioned on the central axes of the respective turnable members 38. The upper intermediate gear 42 mates with the main gear 2. Reference numeral 44 represents a pair of upper and lower bearings for supporting each shaft 41.

A retaining opening 45 is vertically provided within each turnable member 38, and is fitted in its upper portion with a bearing member 46.

A pair of spindles 47 have their shaft portions 48 rotatably supported within the respective retaining openings 45 and the bearing members 46, and are fixedly provided at their upper ends with a spindle gear 49 engaging the lower intermediate gear 43. Reference numeral 50 stands for bearings which support at the respective upper and lower ends the shaft portion 48 of each spindle 47, and 51 for a drill attached to the lower end of each spindle 47.

In the multi-spindle attachment thus arranged, the rotation of the spindle 1b of a drilling machine is transmitted from the main gear 2 to each spindle 47 via both the upper and lower intermediate gears 42, 43 and each spindle gear 49.

Reference will now be made to the action and effect of the thus arranged multi-spindle attachment.

Figure 2:
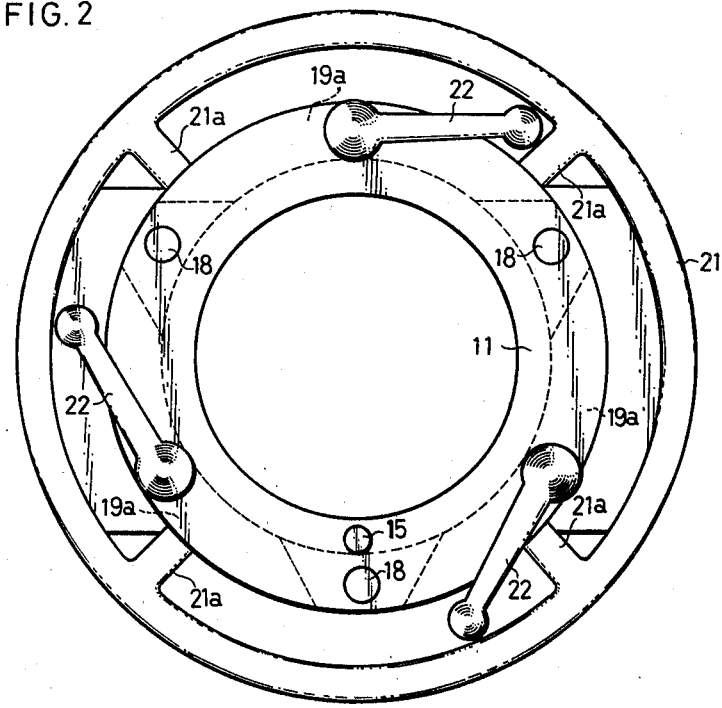
FIGS. 2 and 3 are plan and bottom views of the first embodiment, respectively.

In order to provide four or more bores in the same circumference of a work with a drilling machine having two drills 51 as explained in the foregoing, two bores are first provided by both drills 51 in a state as shown in FIGS. 1 to 3. Both drills 51 are then turned around the spindle quill 1 of the drilling machine, i.e., the mounting cylinder 4 of the attachment in a circumferential direction.

For effecting turning of the drills 51, each clamp lever 22 is first turned to release the support plate 7 and the second ring 26 firmly clamped between the abutment plate 11 and the bottom wall 16c of the mounting member 16, whereby the attachment body 28 is rendered rotatable. The locating pin 15 is pulled out of the locating hole 10 and the through-hole 13, and the turning handle 21 is turned right or left by the hand. As a result, the mounting member 16 turns around the mounting cylinder 4 while the abutment plate 11 comes in sliding contact with the upper face of the support plate 7. The attachment body 28 fixed to the bottom wall 16c of the mounting member 16 then turns around the mounting cylinder 4, correspondingly. It will be understood that turning of the mounting member 16 incidentally causes turning of the second ring 26 on the bottom wall 16c thereof and the first ring 24 touching internally the former.

When the attachment body 28 turns, the upper intermediate gear 42 provided therein moves along the outer periphery of the main gear 2 in a stage where it is kept in mating engagement therewith. Further, turning of the attachment body 28 simultaneously effects rotation of a pair of drills 51 around the mounting cylinder 4, together with the respective turnable members 38 attached to the carrier plates 35.

After the mounting member 16, the attachment body 28 and a pair of drills 51 are turned about 60° in the foregoing manner, the through-hole 13 in the abutment plate 11 is substantially brought in alignment with another locating hole 10, after which the locating pin 15 is inserted into both holes 13 and 10, so that a turning position of the drills 51 is accurately determined. Thereafter, the respective clamp lever 22 are clamped to firmly re-sandwich the support plate 7 and the second ring 26 between the abutment plate 11 and the bottom wall 16c of the mounting member 16, whereby the mounting member 16 is firmly secured to the mounting cylinder 4.

In this manner, the turning operations of both drills 51 are completed. In this state, drilling is again effected on the work so that another two bores are obtained, thus resulting in the provision of a total of four bores.

To obtain a total of six bores, the drills 51 may be rotated further 60° in the same manner as stated above. A still further 60° turning of the drills 51 results in a total of eight bores.

According to the present invention, it is thus possbile to continuously provide bores more than the number of the drills used in a reasonable and simple manner even with a small-sized drilling machine having two drills 51 and limited power output. There is also no need for effecting any turning of the work.

However, this is not the case for the prior art multi-spindle attachment designed such that the attachment body 28 is not rotatable relative to the mounting cylinder 4. In order to obtain a number of bores with the prior art drilling machine having two drills, the work should be rotated for each drilling operation. This is a time-consuming and troublesome operation.

In this embodiment, the position of the drills 51 may be varied by rotation of the respective turnable member 38 relative to the casing 29 of the attachment body 28. This is achieved by making loose the bolts 40 threadedly inserted into the turnable members 38 from below to unloose the carrier plates 35 clamped between the clamp plates 39 and the steps 38a of the turnable members 38. Thus, the members 38 can be turned within the respective mounting openings 37 in the respective carrier plates 35. In this case, each spindle gear 49 moves along the outer periphery of the lower intermediate gear 43 in a state where it mates with said gear 43, since each turnable member 38 turns around the support shafts 41 for the upper and lower intermediate gears 42 and 43.

While the foregoing embodiment is designed to effect turning of the drills 51 at 60° intervals, the turning may be performed at given intervals, e.g., 1°, 90° and 180° intervals.

It will be understood that two or more through-holes 13 may be formed on the abutment plate 11 to use two or more locating pins 15. Alternatively, the locating pin 15 may be inserted into the support plate 7 from the outer periphery of the cylindrical portion 16a forming part of the mounting member 16. Further, the locating hole 10 to be formed in the support plate 7 may be provided by grooving the outer periphery thereof.

Figure 5:
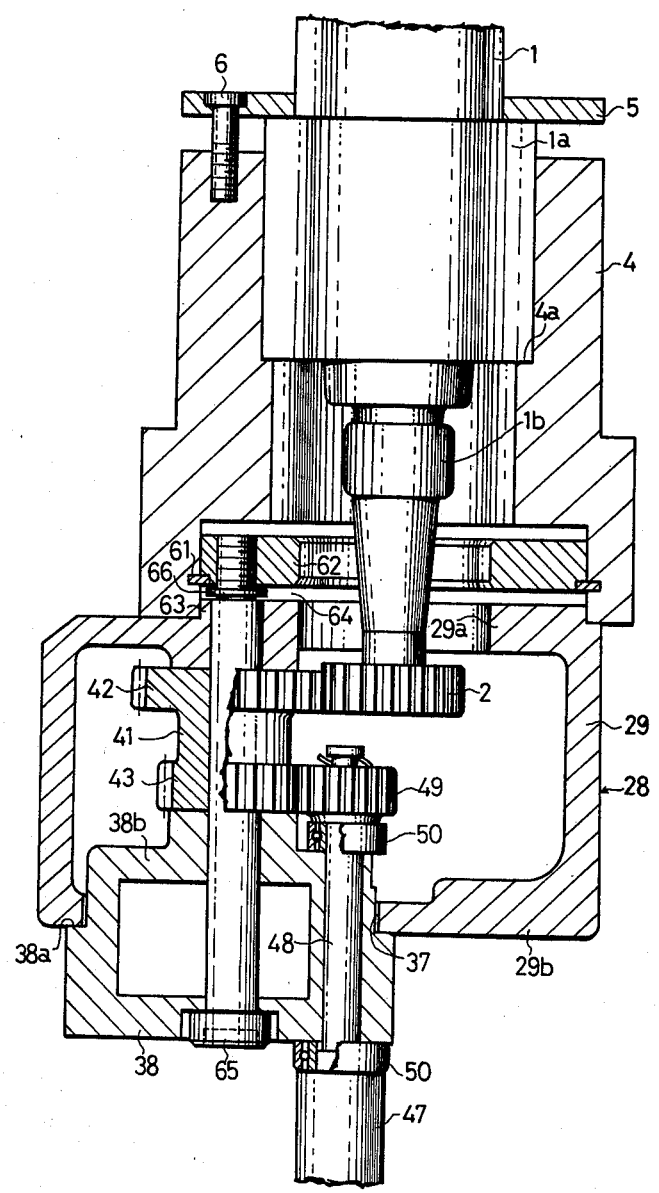
FIG. 5 is a sectional view of a second embodiment of the turning type multi-spindle attachment.

Turning now to FIG. 5 illustrating a second embodiment of the present invention, this embodiment is different from the first embodiment in that point that the mounting member 16 and the support plate 7 therefore are mounted in the interior of the mounting cylinder 4.

A snap ring 61 used as the support plate is mounted around the inner periphery of the lower end of the mounting clylinder 4. An annular support ring 62 is designed to be used as a support plate which is provided in the mounting cylinder 4 such as to engage the upper face of the snap ring 61. An extension 63 formed on the upper face of the attachment casing 29 extends rotatably in the lower portion of the inner end of the mounting cylinder 4. There is a gap 64 between the upper face of said extension and the lower face of the support ring 62.

A pair of support bolts 65 (only one bolt being shown) are inserted into each turnable member 38 from below, and each has its point end threadedly inserted into the support ring 62 through the upper wall 38b of the turnable member 38, the upper wall 29a of the attachment casing 29 and the extension 63 on the casing 29.

The upper and lower intermediate gears 42 and 43 are rotatably supported on a pair of support bolts 65 in the attachment casing 29.

Reference numeral 66 represents a ring mounted on the support bolts 65 for preventing it from slipping down.

In the multi-spindle attachment according to this embodiment, the respective turnable members 38 are thrusted up by a pair of support bolts 65, so that the upper wall 29a of the attachment casing 29 comes into firm contact with the lower end face of the mounting cylinder 4 through said casing 29 in engagement with a step 38a on the outer periphery thereof. Thus, the multi-spindle attachment body 28 is fixed in place such that it is not rotatable relative to the mounting cylinder 4 and, at the same time, the respective turnable member 38 are fixed in place such that they are not turnable relative to the attachment casing 29.

Turning of the drills 51 is caused by unloosing a pair of support bolts 65. Making the bolts 65 loose permits simultaneous release of the firm engagement of the mounting cylinder 4 with the attachment casing 29, and the casing 29 with the turnable member 36, so that the drills 51 are turnable with the casing 29 around the mounting cylinder 4 and with the turnable member 38 around the support bolts 65.

Since the multi-spindle attachment casing 29 is then fixed at an optional turning position by clamping of the support bolts 65, the amount of turning of the drills 51 can be adjusted in a non-stepwise manner.

Figure 6:
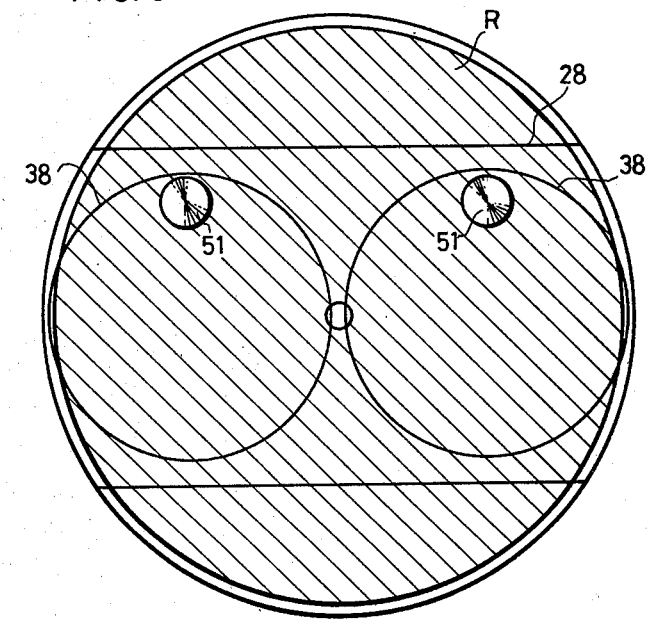
FIG. 6 is a view illustrative of an area on which drilling can be effected by the multi-spindle attachment of the present invention.
Figure 7:
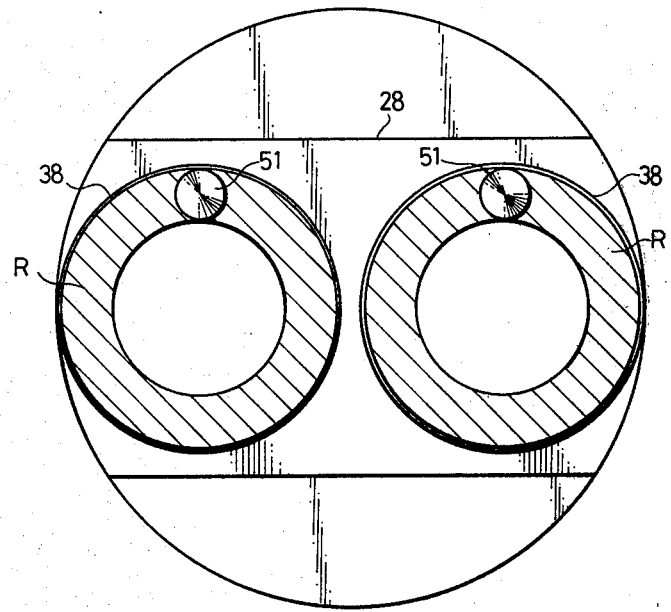
FIG. 7 is a view illustrative of an area on which drilling can be effected by the prior art multi-spindle attachment.

In the foregoing two embodiments, turning of the multi-spindle attachment body 28 is adjustable relative to the mounting cylinder 4, i.e., the spindle quill 1 of the drilling machine, and a pair of turnable members 38 supporting each spindle 47 is adjustable relative to the body 28. Thus, an area R of a work on which drilling can be achieved by a pair of drills is the overall range over which the attachment body 28 turns, as shown by hatches in FIG. 6. In the prior art multi-spindle attachment, on the other hand, the area R is the range over which each drill moves, namely, the outer edge of each turnable member 38 as shown by hatches in FIG. 7, and is thus very narrow. This is because only the turnable member 38 is turnable relative to the attachment body 28.

It will be understood that, besides the drilling machine, the present invention is equally applicable to a tapping machine.

Since it is apparent that a wide variety of different embodiments can be provided without departing from the spirit and scope of the present invention, the invention is not limited thereto and is restricted by the appended claims alone.

What is claimed is:

1. A turning-type multi-spindle attachment for a drilling or tapping machine having a spindle in a spindle quill with an outer periphery, said attachment comprising:

a mounting cylinder 4 non-rotatably attachable to the outer periphery of the spindle quill 1, said mounting cylinder having an axis, a central bore extending therethrough and a lower portion including a recess concentric with and larger in diameter than said central bore, said recess having an inner circumferential periphery;

a body 28 positioned relative to said lower portion such that a turning position thereof is adjustable, said body having an upper face;

a snap ring 61 mounted on said inner periphery of said recess, said snap ring having an upper face;

a support ring 62 positioned in said recess adapted to engage said upper face of said snap ring 61, said support ring having a lower face;

a plurality of turnable members 38 rotatably mounted on said body 28, each of said turnable members being in the form of a substantial cylinder having a central portion and being adapted to rotatably support a drill 51 or tap at a position eccentric to said control portion;

a plurality of mounting bolts 65, each extending through said central portion of one of said turnable members and through said body and being threadedly inserted into said support ring from below, thereby adjustably mounting said turnable members to said body and said body to said mounting cylinder whereby, upon loosening of said bolts, said turnable members can be rotated relative to said body and said body can be rotated relative to said mounting cylinder and, upon tightening of said bolts, said body is clamped to said mounting cylinder and said turnable members are fixed to said body; and a gear transmission mechanism housed in said body interconnecting the spindle to the drills or taps supported in the plurality of turnable members.

2. The turning type multi-spindle attachment as recited in claim 1, in which said body 28 is provided on said upper face with an extension 63 extending in the recess of the mounting cylinder 4, a space 64 is defined between the upper face of the extension 63 and the lower face of the support ring 62, and the support bolts 65 are adapted to bring said body 28 into clamped engagement with the lower end of the mounting cylinder 4 with the use of said space 64; whereby upon location of said body 28, said body is fixed in place such that it is not turnable relative to the mounting cylinder 4.

3. The turning type multi-spindle attachment as recited in claim 1 in which said gear transmission mechanism comprises a main gear 2 attached to the spindle of a drilling or tapping machine, a plurality of intermediate gears 42 and 43 positioned rotatably in said body 28 and adapted to mate with the main gear 2, and a spindle gear 49 secured to the upper ends of each of the drills 51 or taps and adapted to mate with the intermediate gears 42 and 43, said intermediate gears 42 and 43 being rotatably supported on the support bolts 65.

* * * * *